US 7,390,276 B2

(12) United States Patent
Tryphonos

(10) Patent No.: US 7,390,276 B2
(45) Date of Patent: Jun. 24, 2008

(54) BELT ASSEMBLY WITH A TENSIONING DEVICE

(75) Inventor: Andreos Tryphonos, Ilmmuenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/634,971

(22) Filed: Dec. 7, 2006

(65) Prior Publication Data

US 2007/0142146 A1 Jun. 21, 2007

Related U.S. Application Data

(63) Continuation of application No. PCT/EP2005/006041, filed on Jun. 6, 2005, and a continuation of application No. PCT/EP2005/001288, filed on Feb. 9, 2005.

(30) Foreign Application Priority Data

Jun. 8, 2004 (DE) .................. 10 2004 028 017

(51) Int. Cl.
*F16H 7/18* (2006.01)
(52) U.S. Cl. .................. 474/109; 474/110; 474/111; 474/140
(58) Field of Classification Search ......... 474/109–111, 474/117, 140
See application file for complete search history.

(56) References Cited

U.S. PATENT DOCUMENTS

| 3,069,920 A | 12/1962 | Cole et al. | |
| 5,055,088 A | 10/1991 | Cradduck et al. | |
| 6,609,987 B1 * | 8/2003 | Beardmore | 474/111 |
| 6,623,390 B2 * | 9/2003 | Simpson et al. | 474/110 |
| 2003/0228948 A1 * | 12/2003 | Garbagnati et al. | 474/110 |
| 2006/0270502 A1 * | 11/2006 | Markley et al. | 474/111 |
| 2007/0066428 A1 * | 3/2007 | Tryphonos | 474/111 |

FOREIGN PATENT DOCUMENTS

| DE | 8 32 527 | 2/1952 |
| DE | 39 33 943 A1 | 5/1990 |
| DE | 41 14 948 A1 | 12/1991 |

(Continued)

OTHER PUBLICATIONS

International Search Report dated Sep. 16, 2005 with English translation (Four (4) Pages).

(Continued)

*Primary Examiner*—Richard W L Ridley
*Assistant Examiner*—Terence Boes
(74) *Attorney, Agent, or Firm*—Crowell & Moring LLP

(57) ABSTRACT

A belt assembly, particularly for driving camshafts of an internal combustion engine, includes a driving gear, at least one driven gear, a belt, and a first and a second tensioner blade that are joined to one another for transmitting a defined force and motion. One tensioner blade can be subjected to the action of tension force by use of a first tensioning device supported on the tensioner blade on one side and externally on the other, and the tensioner blades can be subjected to the action of tension force by use of a second tensioning device both with regard to one another as well as with regard to a case of the internal combustion engine.

11 Claims, 3 Drawing Sheets

| | FOREIGN PATENT DOCUMENTS | |
|---|---|---|
| DE | 201 02 748 U1 | 1/2002 |
| DE | 100 44 645 A1 | 3/2002 |
| DE | 102 03 941 A1 | 8/2002 |
| EP | 1 369 621 A2 | 12/2003 |
| JP | 2002-89636 A | 3/2002 |

OTHER PUBLICATIONS

German Search Report dated Feb. 23, 2005 with a partial English translation (Eight (8) Pages).

* cited by examiner

BELT ASSEMBLY WITH A TENSIONING DEVICE

CROSS-REFERENCE TO RELATED APPLICATIONS

This application is a continuation of PCT International Application Nos. PCT/EP2005/006041, filed on Jun. 6, 2005 and PCT/EP2005/001288, filed on Feb. 9, 2005, which claims priority under 35 U.S.C. §119 to German Application No. 10 2004 028 017.7, filed Jun. 8, 2004, the entire disclosures of which are expressly incorporated by reference herein.

BACKGROUND AND SUMMARY OF THE INVENTION

The invention relates to a belt assembly, in particular for driving camshafts of an internal combustion engine, including a driving gear, at least one driven gear, a belt, as well as a first and a second tensioner blade. Both tensioner blades are connected together in a manner that transmits a defined force and/or motion.

The camshafts of internal combustion engines are typically driven, starting from the crankshaft, by means of a traction mechanism, such as a control chain or a control belt. In order to prevent vibrations, and in particular transverse vibrations, tensioners are used to tension the belt. Such an arrangement with a chain tensioner, which includes a shoe subjected to the action of mechanical force by way of a leaf spring is described in DE 4114948 A1.

In an arrangement described in DE 4114948 A1, as the tension increases in the strand assigned to the tensioner—for example, due to vibrations of the camshafts—, the other strand becomes slack at least for a short period of time, so that undesired transverse vibrations are excited in the belt. A remedy could be provided with a drive system as shown in DE 201 02 748U1. In this drive system, two tensioner blades are hinged swivellably on one side to a housing of a tensioning device; and hydraulic pistons, acting from inside against the tensioner blades, are mounted in the opposite direction of tension in the housing between the tensioner blades. Therefore, the pistons are supplied over a common hydraulic connection, so that the conditions for adjusting the tension characteristics are met. The drive system described in DE 201 02 748 U1 includes two tensioning devices, which, including the housing, the tensioning pistons and the tensioner blades, are constructed symmetrically in relation to a center line.

As a result of DE 201 02 748U1, the two swivellable tensioner blades are connected together in a manner that transmits a force and motion by way of the two coupled hydraulic pistons. However, there is neither a reference in relation to the stationary housing of the internal combustion engine nor is the transfer of vibrations of one tensioner blade, excited, for example, by oscillating camshafts, to the other tensioner blade, controllable. In addition, the symmetrical design of the tensioning device, which necessitates a linear vibration system, favors the build up of vibrations and, thus, the risk of damage or even the destruction of the belt assembly. Another problem may stem from the air bubbles in the hydraulic system of the pistons. These air bubbles lead to an unknown spring system between the tensioner blades.

There is therefore needed an aforementioned belt assembly, which enables a defined and controlled application of the tension force to the tensioner blades for the active prevention of undesired transverse vibrations. In addition, the belt assembly should be designed simply and optimally and, at the same time, be easy and advantageous to produce, maintain and repair.

These needs are met according to the invention by a belt assembly, in particular for driving camshafts of an internal combustion engine, including a driving gear, at least one driven gear, a belt as well as a first and a second tensioner blade, both tensioner blades being connected together in a manner that transmits a defined force and/or motion by way of a two-part hinge mechanism. One tensioner blade can be subjected to the action of tension force by a first tensioning device, supported on the tensioner blade on one side and externally on the other side. The two parts of the hinge mechanism are connected together in a hinge point. The hinge point can be subjected to the action of tension force by a second tensioning device, and the second tensioning device is supported at the hinge point on the one side and at least indirectly on the internal combustion engine side on the other side.

Thus, according to the underlying idea, one tensioner blade can be subjected to the action of tension force by use of a first tensioning device, supported on the tensioner blade on one side and externally on the other side; and the two parts of the hinge mechanism are connected together in a hinge point. The hinge point can be subjected to the action of tension force by use of a second tensioning device; and the second tensioning device is supported at the hinge point on the one side and at least indirectly on the internal combustion engine side on the other side.

As an alternative, the problem, underlying the invention, may be solved with a belt assembly wherein a tensioner blade can be subjected to the action of tension force by use of a first tensioning device, which is supported on the tensioner blade on one side and externally on the other side. The second tensioner blade includes a second tensioning device with a piston, guided in a cylinder, which is constructed integrally in the tensioner blade; and the connecting link is connected in an articulated manner to the first tensioner blade on one side and to the second tensioning device on the other side.

Another alternative solution of the problem, underlying the invention, may be carried out with a belt assembly wherein a tensioner blade can be subjected to the action of tension force by use of a first tensioning device, which is supported on the tensioner blade on one side and externally on the other side. The second tensioner blade includes a second tensioning device with a piston, guided in a cylinder, constructed integrally in the tensioner blade. The two-part connecting link includes an eccentric cam; and the cam can be subjected to the action of tension force by use of the second tensioning device.

Advantageous embodiments and further developments are described and claimed herein.

It is very advantageous if, in a belt assembly according to the invention, the first part of the two-part hinge mechanism is connected to the first tensioner blade; and the second part of the two-part hinge mechanism is connected to the second tensioner blade. The first part of the two-part hinge mechanism exhibits a longer length than the second part; and the hinge point lies outside the area, enclosed by the belt, so that the second tensioning device, required for applying tension force to the hinge point, can lie outside the area, enclosed by the belt. Furthermore, it is deemed to be advantageous, if in a belt assembly with a second tensioner blade, which can be swivelled about a pivotal point, which is stationary on the internal combustion engine, the second tensioning device includes a piston, which is guided in a cylinder, constructed integrally in the second tensioner blade. The axis of the piston goes at least approximately through the pivotal point of the second tensioner blade. In this way, the second tensioning device can support itself in essence on the internal combustion engine side in that the force flows through the pivotal point to the internal combustion engine. According to a preferred embodiment of the invention, the hinge point of the two-part hinge mechanism includes a roll or ball in the contact area to the piston in order to minimize the friction between the hinge point and the piston of the second tensioning device and to avoid forces transversely to the axis of the piston.

As a result of an especially advantageous embodiment of a belt assembly according to the invention, both ends of the piston are guided in the tensioner blade; and the connecting link is connected to the free central area of the piston. Since the piston is subjected to a load transversely to the axis of the piston, the result is a guide that is especially reliable and stressable. In a belt assembly with a second tensioner blade, which can be swivelled about a pivotal point that is stationary on the internal combustion engine, the axis of the piston of the second tensioning device goes advantageously at least approximately through the pivotal point of the second tensioner blade and encloses with the axis of the connecting link an angle α>90 deg.

Especially preferred is a design of a belt assembly according to the invention, in which the cam exhibits a first curved surface and rests with its curved surface against a corresponding surface of the second tensioner blade. The cam exhibits expediently a second curved surface, which forms the contact area in relation to the second tensioning device. In a belt assembly with a second tensioner blade, which can be swivelled about a pivotal point, which is stationary on the internal combustion engine, it is advantageous if the axis of the piston of the second tensioning device goes at least approximately through the pivotal point of the second tensioner blade.

Embodiments of the invention that are to be especially preferred are explained in detail below with reference to the figures. In this respect the figures are shown in the form of a schematic and as examples of the embodiments.

DETAILED DESCRIPTION OF THE DRAWINGS

Figure 1:
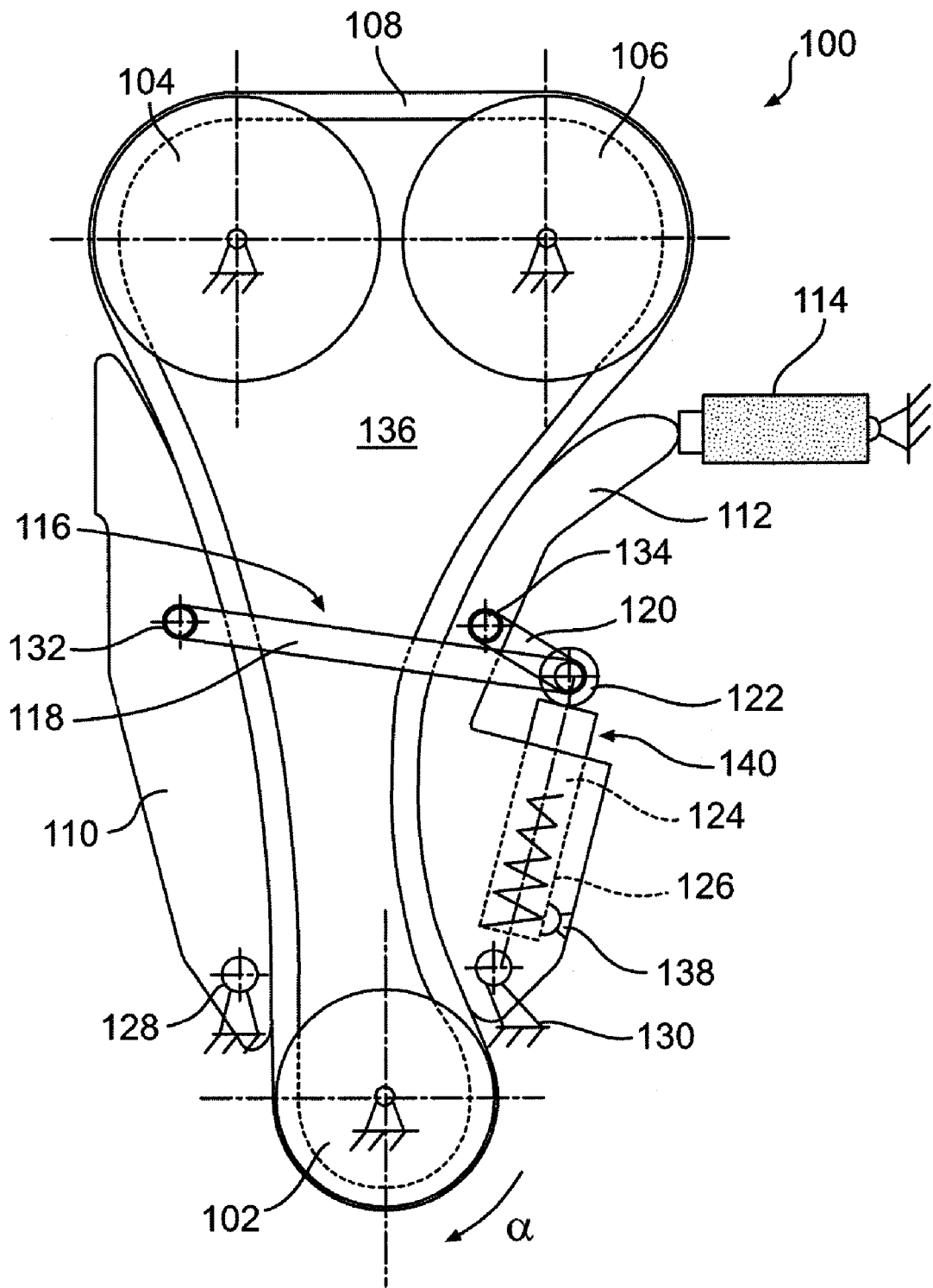
FIG. 1 depicts a belt assembly for driving camshafts of an internal combustion engine including a two-part hinge mechanism, which is subjected to the action of tension force, for the purpose of connecting two tensioner blades in a manner that transmits a defined force and/or motion.

FIG. 1 depicts a belt assembly 100 for driving camshafts 104, 106 of an internal combustion engine, including a two-part hinge mechanism 116, which is subjected to the action of tension force, for the purpose of connecting two tensioner blades 110, 112 in a manner that transmits a defined force and/or motion.

According to the belt assembly 100, depicted in FIG. 1, the camshafts 104, 106 are driven, starting from the crankshaft 102 of a four stroke-reciprocating piston-internal combustion engine (not shown here in detail). One of the camshafts serves to control the intake valves; the other serves to control the exhaust valves. For the transmission of force and/or motion, the present embodiment provides a control chain 108. Instead of a chain, a belt or some other traction mechanism may also be provided.

As indicated in FIG. 1 by means of corresponding diameters of the drive gears, assigned to the crankshaft 102 and/or the camshafts 104, 106, the camshafts 104, 106 rotate at half the speed of the crankshaft 102, so that the result is a charge change period and a compression period every two revolutions of the crankshaft.

When the crankshaft 102 is rotating in a direction corresponding to the direction of arrow "a", the chain section, assigned to the tensioner blade 110, forms the slack length; and the chain section, assigned to the tensioner blade 112, forms the load length, whereby the direction of rotation may also be, if desired, in the opposite direction.

The tensioner blades 110, 112 are constructed, for example, like rails and envelop the chain 108 in such a manner that they also guide laterally. The tensioner blades 110, 112 are made preferably of an oil and heat resistant, abrasion-proof, plastic exhibiting good sliding properties and are connected to the housing of the internal combustion engine (symbolized by the fixed bearing symbols) in such a way that the tensioner blades can be swivelled on their one end, facing the crankshaft, about the pivotal points 128, 130. Therefore, in order to connect so as to rotate, there are pins that sit in the housing of the internal combustion engine. The respective other ends of the tensioner blades 110, 112 are connected in a manner that transmits a defined force and/or motion by way of a two-part hinge mechanism 116, which is subjected to the action of tension force. In principle, therefore, the free ends of the tensioner blades 110, 112 may be swivelled jointly in the same direction and/or swivelled in opposite directions in such a manner that they are subjected to the action of tension force.

The tensioner blade 112 is assigned a tensioning device 114, which is supported on the housing of the internal combustion engine as the stationary external reference point and by use of which a tension force may be applied, preferably hydraulically, mechanically, electromagnetically, pneumatically or by means of an electric motor, to the chain 108 via the tensioner blade 112.

For example, the tensioning device 114 includes a hydraulic piston-cylinder arrangement, which is supplied with oil from the oil circulation of the internal combustion engine by interposing a check valve. As soon as the oil pressure builds up while the internal combustion engine is running, the piston of the tensioning device 114 is impinged upon and the tensioner blade 112 is actuated in the direction of tension. The check valve prevents the pressure from falling in the tensioning device 114, so that the tension force for the belt 108 correlates with the maximum oil pressure. The pressure in the tensioning device 114 drops only due to leakage in the piston. As an alternative, a separate and/or regulated pressure supply for the tensioning device 114 may also be provided.

The two-part hinge mechanism 116 for connecting the tensioner blades 110, 112 includes a part 118, which is connected in an articulating manner to the tensioner blade 110 at a pivot point 132, and a second part 120, which is connected to the tensioner blade 112 at a pivot point 134. The hinge mechanism part 118 exhibits a longer length than the hinge mechanism part 120 such that the hinge point 122, at which the parts 118, 120 are connected together, lies outside the area 136, which is enclosed by the belt 108. The hinge point 122 may be subjected to the action of tension force by use of a second tensioning device 140. Therefore, the tensioning device 140 includes a piston 124, which is guided in a cylinder 126, constructed integrally in the tensioner blade 112. The tensioning device 140 may be actuated in a manner analogous to the tensioning device 114, for example with oil from the oil circulation of the internal combustion engine. A check valve bears the reference numeral 138.

While the piston 124 drives the hinge point 122, the tensioner blades 110, 112 are subjected to the action of force by way of the hinge mechanism 116 with regard to each other, so that the belt 108 is stretched. Vibrations of the belt, in particular transverse vibrations, are spring-loaded in a controlled manner and compensated for in a damped manner by the tensioning device 140 via the hinge mechanism 116 and the hinge point 122. An undefined or undamped transmission of vibrations from one tensioner blade to the other is avoided.

The axis of the piston 124, which can be slid in the longitudinal direction, goes at least approximately through the pivot point 130 of the second tensioner blade 112, so that the second tensioning device 140 is supported in essence on the internal combustion engine side, in that the force flows through the pivotal point 130 to the housing of the internal combustion engine. The hinge point 122 of the two-part hinge mechanism 116 includes a roller or ball in the contact area with respect to the piston 124, in order to minimize the friction between the hinge point 122 and the piston 124 of the second tensioning device 140 and to avoid forces transversely to the axis of the piston.

The damping behavior of the tensioning device 140, acting on the tensioner blades 110, 112, is a function of the design of the hinge mechanism 116. In particular, the damping behavior can be influenced by a suitable choice of the ratio of the length of the parts 118, 120 with respect to each other. If desired, the length of the parts 118, 120 can be adjustable.

Figure 2:
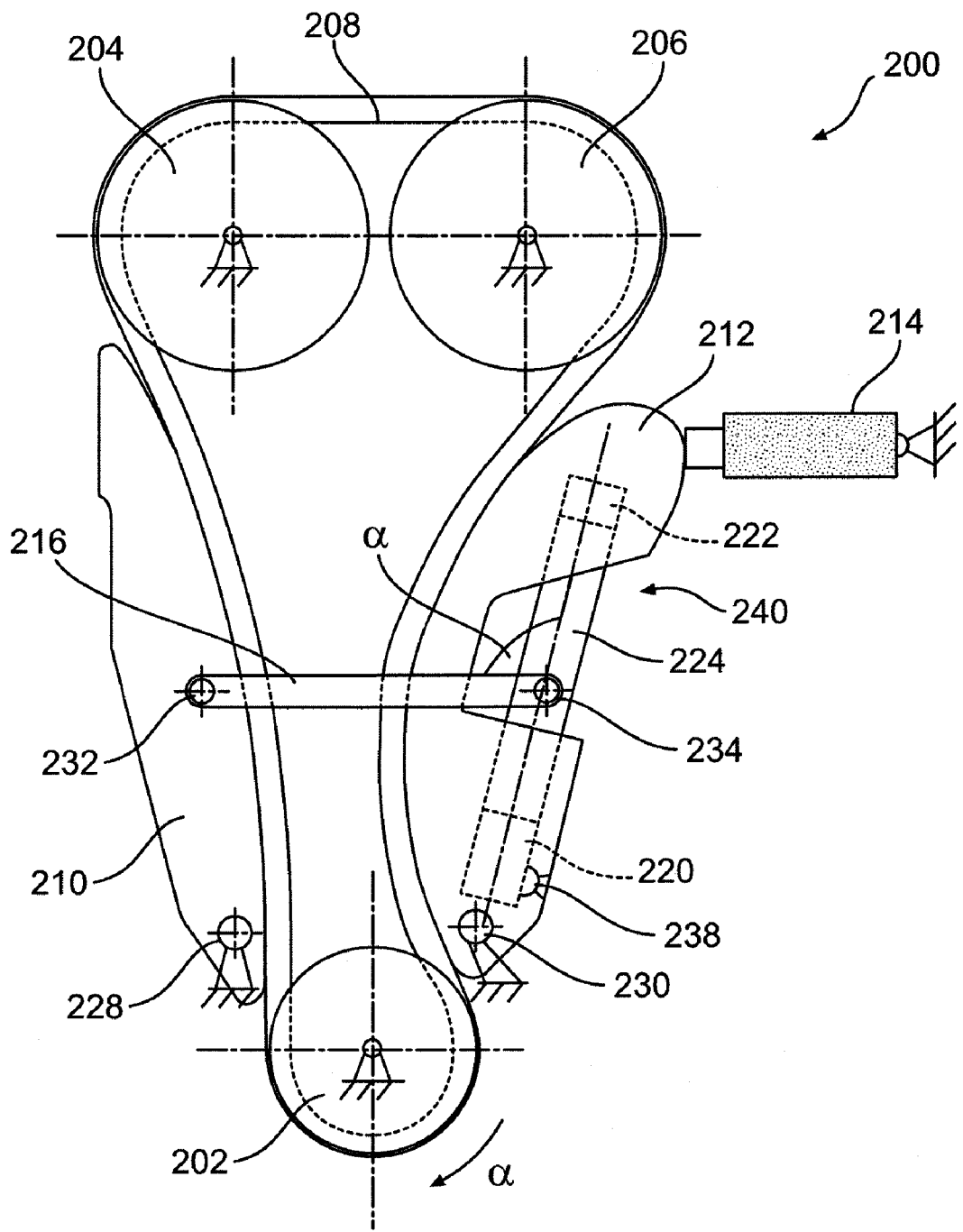
FIG. 2 depicts a belt assembly for driving camshafts of an internal combustion engine including a connecting link, which is subjected to the action of tension force, for the purpose of connecting two tensioner blades in a manner that transmits a defined force and/or motion.

FIG. 2 depicts a belt assembly 200 for driving camshafts 204, 206 of an internal combustion engine with a connecting link 216, which may be subjected to the action of tension force, for the purpose of connecting two tensioner blades 210, 212 in a manner that transmits a defined force and/or motion.

According to the belt assembly 200, depicted in FIG. 2, the camshafts 204, 206 are driven, starting from the crankshaft 202 of a four stroke-reciprocating piston-internal combustion engine (not shown here in detail). One of the camshafts serves to control the intake valves; the other serves to control the exhaust valves. For the transmission of force and/or motion, the present embodiment provides a control chain 208. Instead of a chain, a belt or some other traction mechanism may also be provided.

When the crankshaft 202 is rotating in a direction corresponding to the direction of arrow "a", the chain section, assigned to the tensioner blade 210, forms the slack length; and the chain section, assigned to the tensioner blade 212, forms the load length, whereby the direction of rotation may also be, if desired, in the opposite direction.

The tensioner blades 210, 212 are constructed, for example, like rails and envelop the chain 208 such that they also guide laterally. The tensioner blades 210, 212 are made preferably of an oil and heat resistant, abrasion-proof, plastic exhibiting good sliding properties and are connected to the housing of the internal combustion engine (symbolized by the fixed bearing symbols) in such a way that the tensioner blades can be swivelled on their one end, facing the crankshaft, about the pivotal points 228, 230. Therefore, in order to connect so as to rotate, there are pins that sit in the housing of the internal combustion engine. The respective other ends of the tensioner blades 210, 212 are connected in a manner that transmits a defined force and/or motion by way of a connecting link 216.

In principle, therefore, the free ends of the tensioner blades 210, 212 can be swivelled jointly in the same direction and/or swivelled in opposite directions such that they are subjected to the action of tension force.

The tensioner blade 212 is assigned a tensioning device 214, which is supported on the housing of the internal combustion engine as the stationary external reference point and by use of which a tension force can be applied, preferably hydraulically, mechanically, electromagnetically, pneumatically or by means of an electric motor, to the chain 208 via the tensioner blade 212.

For example, the tensioning device 214 includes a hydraulic piston-cylinder arrangement, which is supplied with oil from the oil circulation of the internal combustion engine by interposing a check valve. As soon as the oil pressure builds up while the internal combustion engine is running, the piston of the tensioning device 214 is impinged upon, and the tensioner blade 212 is actuated in the direction of tension. The check valve prevents the pressure from falling in the tensioning device 214, so that the tension force for the belt 208 correlates with the maximum oil pressure. The pressure in the tensioning device 214 drops only due to leakage in the piston. As an alternative, a separate and/or regulated pressure supply of the tensioning device 214 may also be provided.

One end of the connecting link 216 for connecting the tensioner blades 210, 212 is connected in an articulated manner to the tensioner blade 210 at a pivot point 232; and the other end is connected in an articulated manner to a piston 224, assigned to the tensioner blade 212, at a pivot point 234. The piston 224 is part of a two-part tensioning device 240 for subjecting the two tensioner blades 210, 212 to the action of tension force with respect to each other and is guided on both sides in the cylinders 220, 222, which are constructed integrally in the tensioner blade 212. The result is a free central area, in which the connecting link 216 is hinged. The axis of the piston 224 encloses, with the axis of the connecting link 216, an angle α>90 deg., so that when the tensioning device 240 is actuated, the tensioner blades can be put under tension with respect to each other. The tensioning device 240 may be actuated in a manner analogous to the tensioning device 214, for example with oil from the oil circulation of the internal combustion engine. A check valve bears the reference numeral 238.

While the piston 224 is driven in the direction of tension, the tensioner blades 210, 212 are subjected to the action of force by way of the connecting link 116 with regard to each other, so that the belt 208 is stretched. Vibrations of the belt, in particular transverse vibrations, are spring-loaded in a controlled manner and compensated for in a damped manner by the tensioning device 240 via the connecting link 216. An undefined or undamped transmission of vibrations from one tensioner blade to the other is avoided.

The axis of the piston 224, which can be slid in the longitudinal direction, goes at least approximately through the pivot point 230 of the second tensioner blade 212, so that the second tensioning device 240 is supported in essence on the internal combustion engine side, in that the force flows through the pivot point 230 to the housing of the internal combustion engine.

The damping behavior of the tensioning device 240, acting on the tensioner blades 210, 212, is a function of the design of the connecting link 216. In particular, the damping behavior may be influenced by a suitable choice of the hinge point 234 and the angle α of the damping behavior. If desired, the hinge point 234 can be adjustable.

Figure 3:
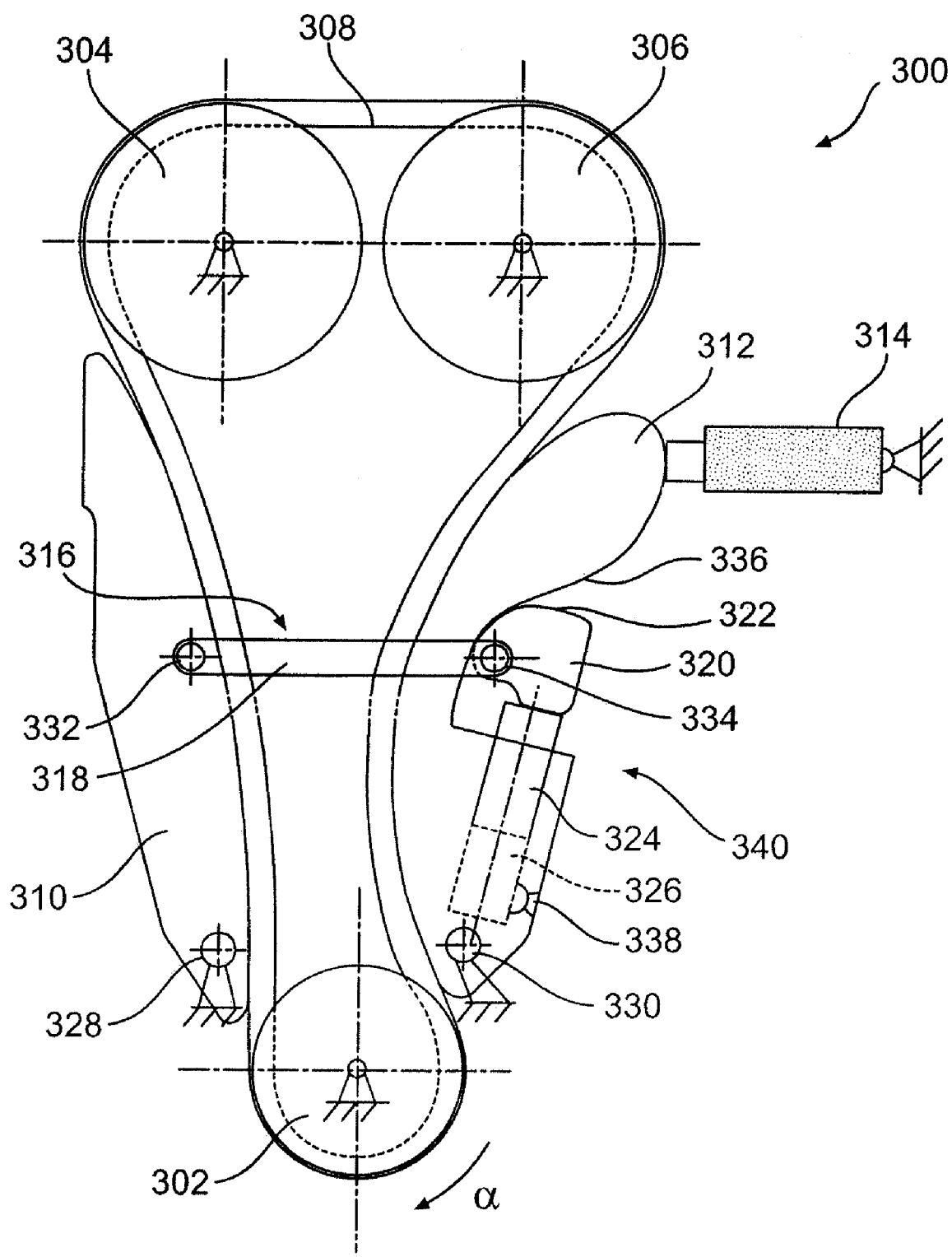
FIG. 3 depicts a belt assembly for driving camshafts of an internal combustion engine including a two-part connecting link, which is subjected to the action of tension force, for the purpose of connecting two tensioner blades in a manner that transmits a defined force and/or motion.

FIG. 3 depicts a belt assembly 300 for driving camshafts 304, 306 of an internal combustion engine including a two-part hinge mechanism 316, which is subjected to the action of tension force, for the purpose of connecting two tensioner blades 310, 312 in a manner that transmits a defined force and/or motion.

According to the belt assembly 300, depicted in FIG. 3, the camshafts 304, 306 are driven, starting from the crankshaft 302 of a four stroke-reciprocating piston-internal combustion engine (not shown here in detail). One of the camshafts serves to control the intake valves; the other serves to control the exhaust valves. For the transmission of force and/or motion, the present embodiment provides a control chain 308. Instead of a chain, a belt or some other traction mechanism may also be provided.

As indicated in FIG. 3 by means of corresponding diameters of the drive gears, assigned to the crankshaft 302 and/or the camshafts 304, 306, the camshafts 304, 306 rotate at half the speed of the crankshaft 302, so that the result is a charge change cycle and a compression cycle every two revolutions of the crankshaft.

When the crankshaft 302 is rotating in a direction corresponding to the direction of arrow "a", the chain section, assigned to the tensioner blade 310, forms the slack length; and the chain section, assigned to the tensioner blade 312, forms the load length, whereby the direction of rotation may also be, if desired, in the opposite direction.

The tensioner blades 310, 312 are constructed, for example, like rails and envelop the chain 308 in such a manner that they also guide laterally. The tensioner blades 310, 312 are made preferably of an oil and heat resistant, abrasion-proof, plastic exhibiting good sliding properties and are connected to the housing of the internal combustion engine (symbolized by the fixed bearing symbols) such that the tensioner blades may be swivelled on their one end, facing the crankshaft, about the pivotal points 328, 330. Therefore, in order to connect so as to rotate, there are pins that sit in the housing of the internal combustion engine. The respective other ends of the tensioner blades 310, 312 are connected in a manner that transmits a defined force and/or motion by way of a two-part connecting link 316. In principle, therefore, the free ends of the tensioner blades 310, 312 can be swivelled jointly in the same direction and/or swivelled in opposite directions in such a manner that they are subjected to the action of tension force.

The tensioner blade 312 is assigned a tensioning device 314, which is supported on the housing of the internal combustion engine as the stationary external reference point and by which a tension force may be applied, preferably hydraulically, mechanically, electromagnetically, pneumatically or by means of an electric motor, to the chain 308 via the tensioner blade 312.

For example, the tensioning device 314 includes a hydraulic piston-cylinder arrangement, which is supplied with oil from the oil circulation of the internal combustion engine by interposing a check valve. As soon as the oil pressure builds up while the internal combustion engine is running, the piston of the tensioning device 314 is impinged upon; and the tensioner blade 312 is actuated in the direction of tension. The check valve prevents the pressure from falling in the tensioning device 314, so that the tension force for the belt 308 correlates with the maximum oil pressure. The pressure in the tensioning device 314 drops only due to leakage in the piston. As an alternative, a separate and/or regulated pressure supply of the tensioning device 314 may also be provided.

The two-part connecting link 316 for connecting the tensioner blades 310, 312 includes a part 318, which is connected in an articulating manner to the tensioner blade 310 at a pivot point 332 on the one side and to an eccentric cam 320 at a pivot point 334 on the other side. The eccentric cam 320 exhibits a first curved surface 322, with which it rests against a corresponding surface 336 of the second tensioner blade 321. In addition, the cam 320 exhibits a second curved surface, which forms the contact area with respect to the second tensioning device 340 and can be subjected to the action of tension force by use of a second tensioning device 340. The tensioning device 340 includes a piston 324, which is guided in a cylinder 326, constructed integrally in the tensioner blade 312. The tensioning device 340 may be actuated in a manner analogous to the tensioning device 314, for example with oil from the oil circulation of the internal combustion engine. A check valve bears the reference numeral 338.

While the piston 324 drives the cam 320, the tensioner blades 310, 312 are subjected to the action of force by way of the two-part connecting link 316 with regard to each other, so that the belt 308 is stretched. Vibrations of the belt, in particular transverse vibrations, are spring-loaded in a controlled manner and compensated for in a damped manner by the tensioning device 340 via the connecting link 316. An undefined or undamped transmission of vibrations from one tensioner blade to the other is avoided.

The axis of the piston 324, which can be slid in the longitudinal direction, goes at least approximately through the pivotal point 330 of the second tensioner blade 312, so that the second tensioning device 340 is supported, in essence, on the internal combustion engine side, in that the force flows through the pivotal point 330 to the housing of the internal combustion engine.

The damping behavior of the tensioning device 340, acting on the tensioner blades 310, 312, is a function of the design of the two-part connecting link 316. In particular, the damping behavior may be influenced by a suitable choice of the curved cam surface 322 and the corresponding surface 336.

With this inventive configuration vibrations are effectively avoided at the control drive, a state that ultimately results in a decrease in the load and makes it easier to dimension the entire control drive. A more exact engine valve timing is achieved; and the accessories are subjected to a lower load; the engine smoothness is enhanced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A belt assembly for use in driving camshafts of an internal combustion engine, comprising:
    a driving gear;
    at least one driven gear;
    a belt coupling the driving gear with the at least one driven gear;
    a first and a second tensioner blade;
    a two-part hinge mechanism for coupling together the first and the second tensioner blades so as to transmit at least one of a defined force and a motion, wherein the two parts of the two-part hinge mechanism are coupled together via a hinge point;
    a first tensioning device, supported on one of the tensioner blades on one side and externally on another side, the first tensioning device subjecting the one tensioner blade to a tension force action;
    a second tensioning device which subjects the hinge point to a tension force action, the second tensioning device being supported at the hinge point on one side and, at least indirectly, on the internal combustion engine on the other side.

2. The belt assembly, as claimed in claim 1, wherein a first part of the two-part hinge mechanism is connected to the first tensioner blade; and a second part of the two-part hinge mechanism is connected to the second tensioner blade, and further wherein the first part of the two-part hinge mechanism exhibits a longer length than the second part, and the hinge point lies outside an area that is enclosed by the belt.

3. The belt assembly, as claimed in claim 2, wherein the second tensioner blade is swivellable about a pivot point, which is stationary on the internal combustion engine, and further wherein the second tensioning device comprises a piston, which is guided in a cylinder, constructed integrally in the second tensioner blade, an axis of said piston going at least approximately through the pivot point of the second tensioner blade.

4. The belt assembly, as claimed in claim 1, wherein the second tensioner blade is swivellable about a pivot point, which is stationary on the internal combustion engine, and further wherein the second tensioning device comprises a piston, which is guided in a cylinder, constructed integrally in the second tensioner blade, an axis of said piston going at least approximately through the pivot point of the second tensioner blade.

5. The belt assembly, as claimed in claim 1, wherein the hinge point of the two-part hinge mechanism comprises a roller or ball in a contact area with the piston.

6. The belt assembly, as claimed in claim 1, wherein at least one of the first and the second tensioning device is actuated hydraulically, mechanically, electromagnetically, pneumatically or via an electric motor.

7. The belt assembly, as claimed in claim 6, wherein the first and second tensioning devices each comprise a hydraulically driven piston.

8. The belt assembly, as claimed in claim 6, wherein the tensioning devices are supplied hydraulically with lubricating oil of the internal combustion engine.

9. The belt assembly, as claimed in claim 6, wherein at least approximately constant pressure, which does not drop below a predetermined minimum value, is applied to the tensioning devices.

10. The belt assembly, as claimed in claim 6, wherein discrete or continuously varying pressure is applied in a controlled manner to the tensioning devices.

11. The belt assembly, as claimed in claim 6, further comprising a check valve by which at least one of the first tensioning device and the second tensioning device is supplied with a pressure medium.

* * * * *